(12) United States Patent
Batarseh et al.

(10) Patent No.: US 7,471,524 B1
(45) Date of Patent: Dec. 30, 2008

(54) ISOLATED DC-DC CONVERTERS WITH HIGH CURRENT CAPABILITY

(75) Inventors: Issa Batarseh, Orlando, FL (US);
Liangbin Yao, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 63 days.

(21) Appl. No.: 11/753,964

(22) Filed: May 25, 2007

Related U.S. Application Data

(60) Provisional application No. 60/808,612, filed on May 26, 2006.

(51) Int. Cl.
*H02M 3/335* (2006.01)
*H02M 5/42* (2006.01)

(52) U.S. Cl. .......................... 363/25; 363/21.06; 363/90; 363/127

(58) Field of Classification Search ............... 363/21.06, 363/21.14, 24, 25, 26, 81, 82, 88, 89, 90, 363/125, 127
See application file for complete search history.

(56) References Cited

U.S. PATENT DOCUMENTS

| | | | |
|---|---|---|---|
| 4,581,690 A * | 4/1986 | Russell ........................ | 363/17 |
| 5,321,596 A * | 6/1994 | Hurst ........................... | 363/8 |
| 5,353,212 A * | 10/1994 | Loftus, Jr. .................... | 363/17 |
| 5,539,630 A | 7/1996 | Pietkiewicz et al. | |
| 5,541,828 A | 7/1996 | Rozman | |
| 5,808,879 A | 9/1998 | Liu et al. | |
| 5,877,945 A | 3/1999 | Liu | |
| 5,936,853 A | 8/1999 | Mweene | |
| 6,445,599 B1 * | 9/2002 | Nguyen ....................... | 363/25 |
| 6,549,436 B1 * | 4/2003 | Sun ............................ | 363/44 |
| 6,590,791 B1 * | 7/2003 | Zhou et al. ................... | 363/25 |
| 6,822,882 B1 | 11/2004 | Jacobs et al. | |
| 6,836,414 B1 | 12/2004 | Batarseh et al. | |
| 6,882,548 B1 | 4/2005 | Jacobs et al. | |
| 6,906,931 B1 * | 6/2005 | Batarseh et al. ............... | 363/17 |

(Continued)

OTHER PUBLICATIONS

Jaber A. Abu-Quhouq, Hong Mao, Issa Batarseh, "Alternated duty cycle control method for half-bridge DC-DC converter," Chapter 3. Control in Power Electronic Circuits, Hait Journal of Science and Engineering B, vol. 2, Issues 5-6, pp. 581-593. USA.

*Primary Examiner*—Gary L Laxton
(74) *Attorney, Agent, or Firm*—Brian S. Steinberger; Phyllis K. Wood; Law Offices of Brian S. Steinberger, P.A.

(57) ABSTRACT

A DC-to-DC converter having a transformer with a primary and a tapped secondary, two serial output filter inductors connected parallel with the secondary, a center output filter inductor connected between the secondary tap and serial output inductors, two serially connected switches connected in parallel with the two output inductors for receiving a signal to control operation of the switches during steady state and an output load connected between the serial connection of the serial output inductors and serial switching devices. The transformer primary side connected with double-ended primary-side topologies. The transformer secondary and output filers configured to form a current tripler rectifier, current quadtupler rectifier or current N-tuper rectifier. The output filter inductors evenly share output current resulting in reduction of current and thermal stress during high current application and the rectification topology has simple driving for synchronous rectifier application without increasing complexity of control and operation of primary-side topologies.

20 Claims, 11 Drawing Sheets

U.S. PATENT DOCUMENTS

| | | |
|---|---|---|
| 6,954,367 B2 | 10/2005 | Yang et al. |
| 6,980,447 B1 | 12/2005 | Schaible et al. |
| 6,982,887 B2 * | 1/2006 | Batarseh et al. ............... 363/89 |
| 7,009,849 B2 * | 3/2006 | Ramabhadran et al. ....... 363/16 |
| 7,049,712 B2 | 5/2006 | Ying et al. |
| 7,196,916 B2 | 3/2007 | Batarseh et al. |
| 7,342,811 B2 * | 3/2008 | Domb et al. ............. 363/21.06 |

* cited by examiner

Transformer primary voltage

Fig. 11

| Rectifier Topology | Center-tapped Rectifier | Current Doubler Rectifier | Current Tripler Rectifier | | |
|---|---|---|---|---|---|
| DC Voltage Gain | $\frac{2}{N} \cdot D$ | $\frac{2}{N} \cdot D$ | $\frac{2}{N} \cdot D$ | | |
| Transformer Secondary Winding RMS Current | $\sqrt{\frac{1}{4}+\frac{D}{2}} \cdot I_o$ | $\sqrt{\frac{D}{2}} \cdot I_o$ | $\sqrt{\frac{1}{36}+\frac{D}{2}} \cdot I_o$ | | |
| SR Voltage Stress | $\frac{V_{in}}{N} \cdot 2$ | $\frac{V_{in}}{N} \cdot 2$ | $\frac{V_{in}}{N} \cdot 2$ | | |
| SR RMS Current | $\sqrt{\frac{1}{4}+\frac{D}{2}} \cdot I_o$ | $\sqrt{\frac{1}{4}+\frac{D}{2}} \cdot I_o$ | $\sqrt{\frac{1}{4}+\frac{D}{2}} \cdot I_o$ | | |
| Inductor DC Current | L : $I_o$ | $L_1$ : $\frac{I_o}{2}$ ; $L_2$ : $\frac{I_o}{2}$ | $L_1$ : $\frac{I_o}{3}$ | $L_2$ : $\frac{I_o}{3}$ | $L_3$ : $\frac{I_o}{3}$ |
| Inductance Values For Identical output current ripples | $L_{Cent-tapped} = L$ | $L_{CDR} = 2L$ | $L_{CTR} = 3L^{}$ | $L_{CTR} = 3L^{}$ | $L_{CTR} = 3L^{**}$ |
| Total Inductor Copper Loss* | $I_o^2 \cdot R_L$ | $\frac{1}{2} \cdot I_o^2 \cdot R_L$ | $\frac{1}{3} \cdot I_o^2 \cdot R_L$ | | |
| Total Output Current Ripple | $\frac{V_o \cdot T \cdot (1-2 \cdot D)}{2} \cdot \frac{1}{L}$ | $\frac{V_o \cdot T \cdot (1-2 \cdot D)}{2} \cdot (\frac{1}{L_1}+\frac{1}{L_2})$, $\frac{V_o \cdot T \cdot (1-2 \cdot D)}{2} \cdot \frac{1}{L}$, for $L_1 = L_2 = 2L$ | $\frac{V_o \cdot T \cdot (1-2 \cdot D)}{2} \cdot (\frac{1}{L_1}+\frac{1}{L_2}+\frac{1}{L_3})$, for $L_1 = L_2 = L_3 = 3L$ | | |
| Individual Inductor Current Ripple | L : $\frac{V_o}{2 \cdot L} \cdot (1-D) \cdot T$ | $L_1$ : $\frac{V_o}{L_1} \cdot (1-D) \cdot T$ ; $L_2$ : $\frac{V_o}{L_2} \cdot (1-D) \cdot T$ | $L_1$ : $\frac{V_o}{L_1} \cdot (1-D) \cdot T$ | $L_2$ : $\frac{V_o}{L_2} \cdot (1-D) \cdot T$ | $L_3$ : $\frac{V_o}{2 \cdot L_3} \cdot (1-2 \cdot D) \cdot T$ |

*Given the DCR value of each inductor is $R_L$.
**Various sets of inductance values can be selected for identical output current ripples.

ISOLATED DC-DC CONVERTERS WITH HIGH CURRENT CAPABILITY

This application claims the benefit of priority to U.S. Provisional Patent Application No. 60/808,612 filed on May 26, 2006.

FIELD OF THE INVENTION

This invention relates to DC-to-DC converters and, in particular, to methods, systems, apparatus and devices for high-density, high-frequency, and high efficiency isolated dc-dc converters.

BACKGROUND AND PRIOR ART

There are three conventional rectifier topologies for low voltage applications. FIG. 1a shows the prior art forward rectifier with its main switching waveforms for steady-state operation. As shown by the waveforms in FIG. 1b, the rectifier transformer has unidirectional utilization. There is one output filter inductor, which carries full load current, leading to high current and thermal stresses for high current applications. Another problem with the prior art forward rectifier is that full load dc current bias is difficult for the inductor magnetic design and always results in bulky inductor size and hence inflexibility for PCB layout designs. As a result, the forward rectification is not suitable for high current applications.

For the center-tapped rectifier, the transformer utilization is bi-directional, however, a single output filter inductor is used to carry the whole load current. The conventional center-tapped rectifier is shown in FIG. 2a, and its key steady-state operation waveforms are shown in FIG. 2b. As shown, the transformer utilization are bi-directional, however, a single output filter inductor is utilized to carry the whole load current. Therefore, the filter inductor suffers high current and thermal stresses for high current applications, resulting in bulky inductor size and inflexibility for footprint budget and PCB layout. Moreover, the transformer secondary windings are not efficiently utilized due to the fact that one of two tapped secondary windings conducts the full load current for half of the switching period. Consequently, center-tapped rectifier is not well suited for high current applications.

FIG. 3a shows a current doubler rectifier and the corresponding key steady-state operation waveforms are shown in FIG. 3b. As shown, there are two output filter inductors, and each carries only half of the load current. Compared with center-tapped rectifier, the copper loss in the inductors is reduced and inductor magnetic design is simplified since each inductor carries half of the load current, which results in better thermal management and design flexibility. In addition, the transformer utilization is improved since the transformer secondary winding is used for bi-directional currents over the whole switching cycle and the transformer winding carries half of the load current.

In high-performance microprocessor and telecommunication applications, the system operation speed and integration density keeps increasing so that the required converter supply voltage continuously decreases while supply current continuously increases due to the increasing power level requirement. Since real estate on printed circuit boards is limited, high-current high-power-density power conversion is demanded for microprocessor and telecommunication applications. In general, conversion efficiency and thermal management are the restrictions against high power density.

High switching frequency is an effective way to improve power density, and topologies featuring high efficiency at high switching frequency are desirable. In addition, topologies with even current and thermal stresses are also demanded, especially for low voltage and high current applications. Because secondary-side conduction loss dominates the overall power loss in isolated low-voltage high-current dc-dc converters, secondary-side topologies are desirable to have low conduction loss and well-distributed power dissipation to improve overall conversion efficiency and satisfy thermal management requirement.

The present invention provides current tripler rectification topology for high current applications. Basically, an additional inductor is added in the current doubler rectifier to help share the load current, and each inductor carries only one-third of the load current. As a result, it has better power dissipation than the conventional center-tapped and current doubler topologies, leading to better thermal management and potentially improved power density. In addition, compared to center-tapped rectifier, transformer secondary winding utilization is also improved and the transformer winding conduction loss is reduced.

SUMMARY OF THE INVENTION

A primary objective of the invention is to provide new methods, systems, apparatus and devices for a current tripler secondary-side rectification topology for use in isolated dc-dc converters in high current applications.

A secondary objective of the invention is to provide new methods, systems, apparatus and devices for a current tripler secondary-side rectification for use in various primary topologies such as full bridge, half bridge and push pull topologies.

A third objective of the invention is to provide new methods, systems, apparatus and devices for a current tripler secondary-side rectification that has good thermal management, simplified magnetic design and low copper loss for inductor and transformer due to the fact that the load current is better distributed in three inductors.

A forth objective of the present invention is to provide new methods, systems, apparatus and devices for a current tripler secondary-side rectification that has high current capability; the rectification topology of the present invention has simple driving for synchronous rectifier application without increasing the complexity of the control and operation of primary-side topologies.

A fifth objective of the present invention is to provide new methods, systems, apparatus and devices for a current quadrupler rectification topology.

A sixth objective of the present invention is to provide new methods, systems, apparatus and devices for a current N-trupler rectifier topology.

A seventh objective of the present invention is to provide new methods, systems, apparatus and devices for secondary-side rectification topology in isolated converters.

The present invention provides a DC-to-DC converter having a transformer with a primary side winding and a secondary side winding having a tap, at first and second output filter inductor serially connected in parallel with the secondary winding, a center output filter inductor having a first end and a second end, the first end connected to the secondary tap and second end connected to a serial connection of the first and second output filter inductor, a serially connected first and a second switching device connected in parallel with the first and second output inductors for receiving a driving signal to control the operation of the first and second switching devices during steady state operation and a output load connected between the serial connection of the first and second output inductor and the serial connection of the first and second switching devices, wherein the output filter inductors evenly share an output current resulting in a reduction in current and thermal stress for high current application. The input stage applying ac voltage to the primary side winding of the transformer is a double-ended primary-side topology, such as a half bridge primary topology, a full bridge primary topology and a push-pull primary topology.

In a first embodiment, the transformer secondary winding is a center-tapped secondary winding and the transformer has a turns ration is n: 1:1 and the center output filter inductance includes a third output filter inductor forming a current tripler rectification topology, wherein the current tripler rectifier control and operation of the primary side topologies is the same as used for conventional center-tapped and current doubler rectifiers.

In a second embodiment, the transformed secondary side winding has a first and a second tap, the first tap between a first and second secondary winding and the second tap between the second secondary winding and a third secondary winding and the center output filter inductors include a fourth output filter inductor connected between the first tap and the serial connection of the first and second output filter inductors and a fifth output filter inductor connected between the second tap and the serial connection of the first and second output filter inductors forming a current quadrupler rectifier, wherein the first, second, fourth and fifth output filter inductors evenly share a load current and the transformer secondary side winding carries partial load current to have higher current capability for DC-DC conversion.

Another embodiment of the present invention provides a current N-tupler, wherein the transformer includes N-1 secondary-side windings having N-2 secondary taps between adjacent secondary side windings and the center output filter inductor includes N output filter inductors, one end of each output filter inductors connected to one of the (N-2) secondary side taps, the other end of the N output filter inductors connected to the serial connection of the first and second output filter inductors to form the N-tupler rectifier, wherein each of the N output filter inductors evenly shares 1/N load current.

Further objects and advantages of this invention will be apparent from the following detailed description of preferred embodiments which are illustrated schematically in the accompanying drawings.

BRIEF DESCRIPTION OF THE FIGURES

FIG. 1b shows waveforms corresponding to steady state operation of the forward rectifier shown in FIG. 1a.

FIG. 2b shows waveforms corresponding to steady state operation of the center-tapped rectifier shown in FIG. 2a.

FIG. 3b shows waveforms corresponding to steady state operation of the current doubler rectifier shown in FIG. 3a.

FIG. 4b shows waveforms corresponding to steady state operation of the current tripler rectifier shown in FIG. 4a.

FIG. 11 is a table showing a comparison between the topology of the present invention and the conventional center-tapped and current-doubler rectifiers.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1A:
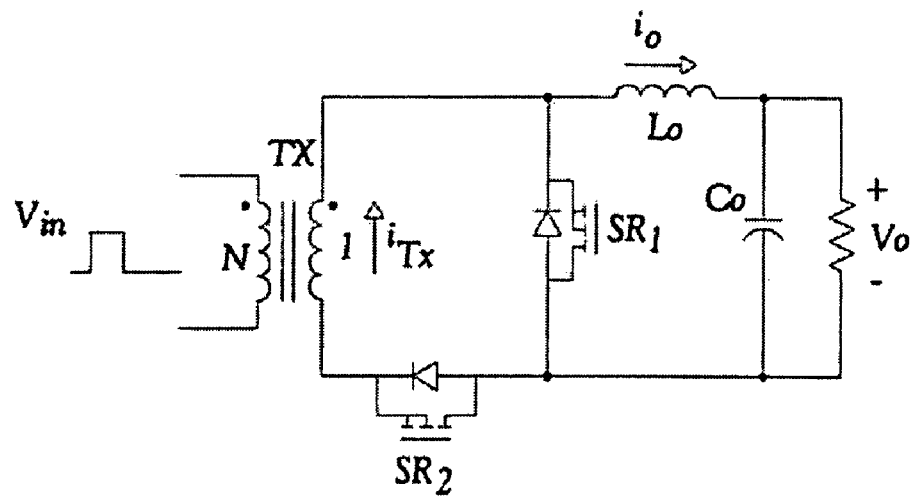
FIG. 1a is a schematic diagram of a prior art forward rectifier (half-wave rectifier).
Figure 1B:
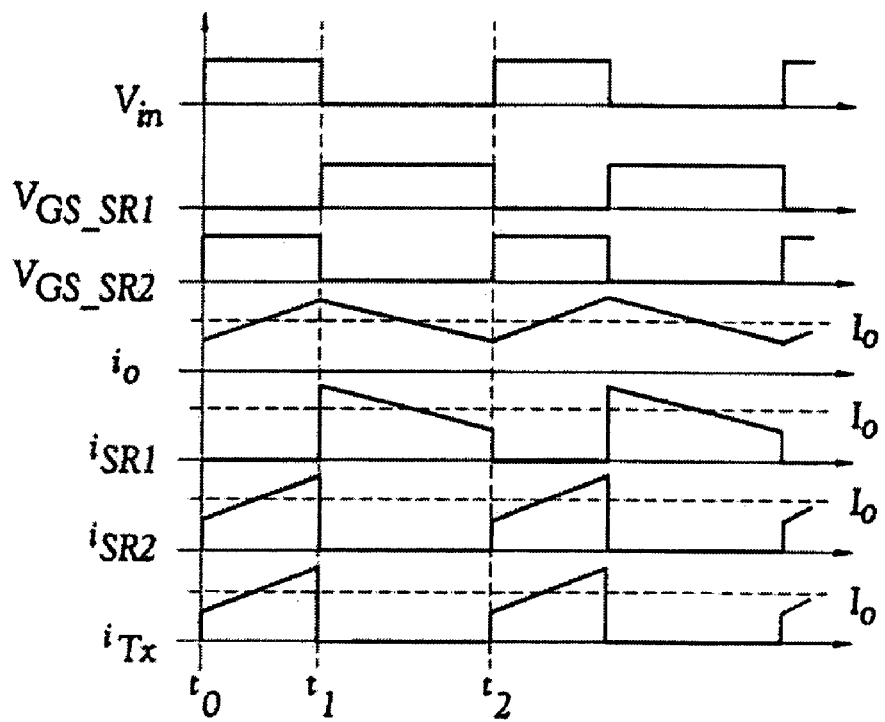
Figure 2A:
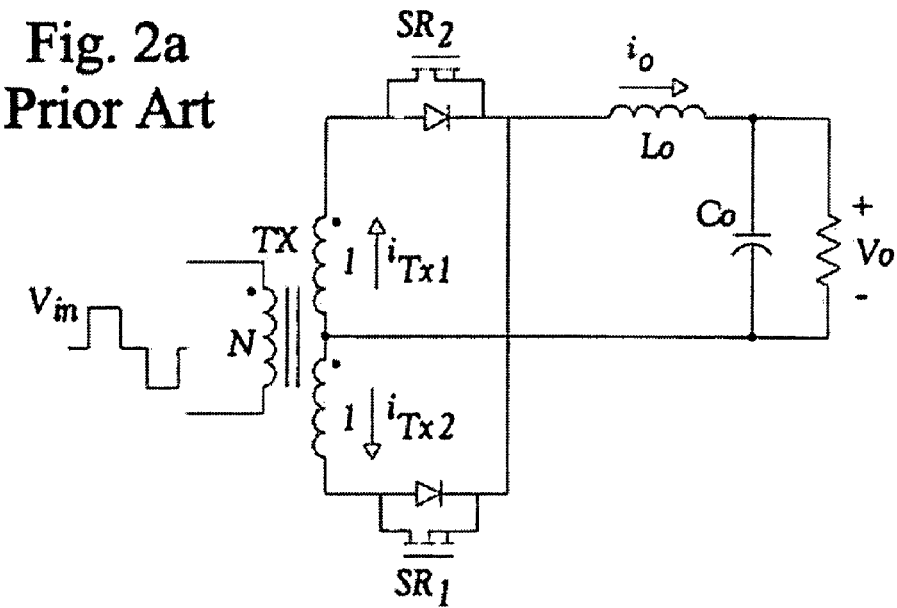
FIG. 2a is a schematic diagram of a prior art center-tapped rectifier.
Figure 2B:
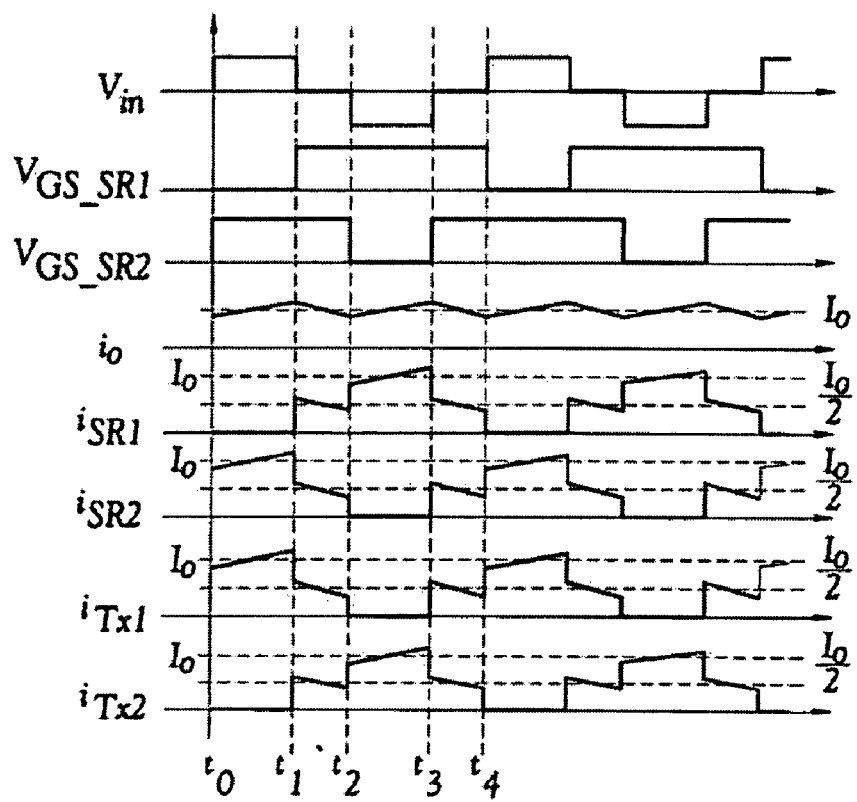
Figure 3A:
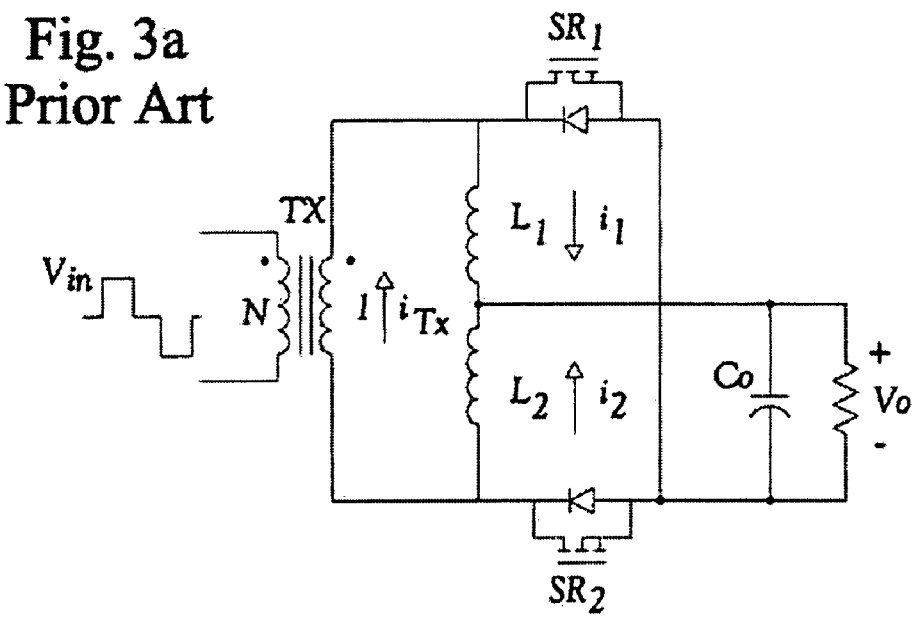
FIG. 3a is a schematic diagram of a prior art current doubler rectifier.
Figure 3B:
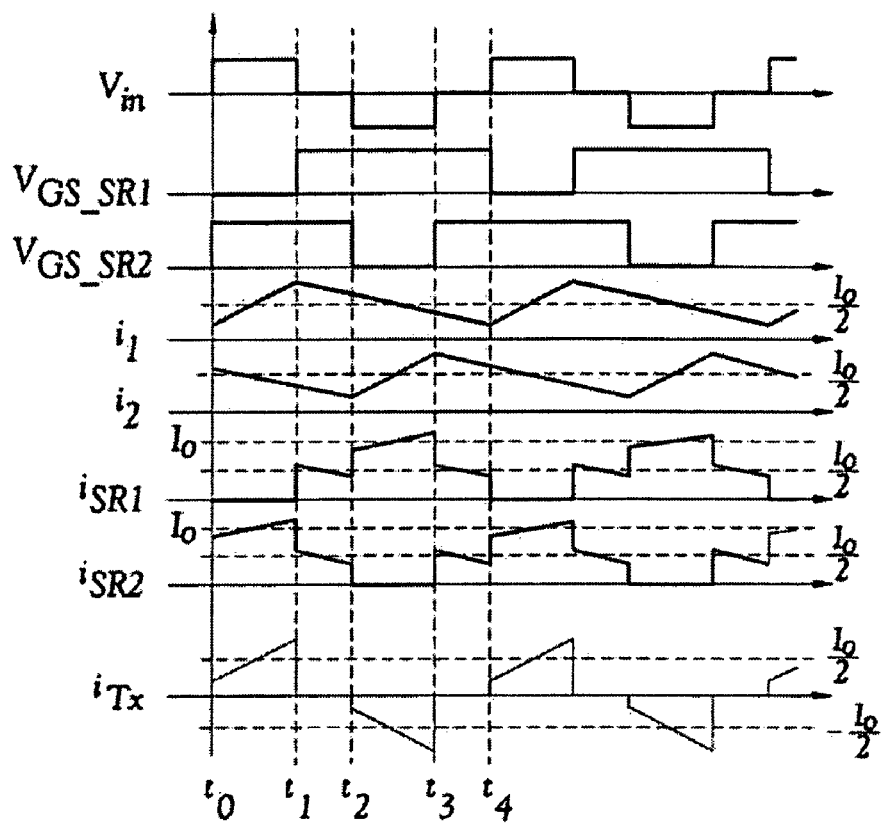
Figure 4A:
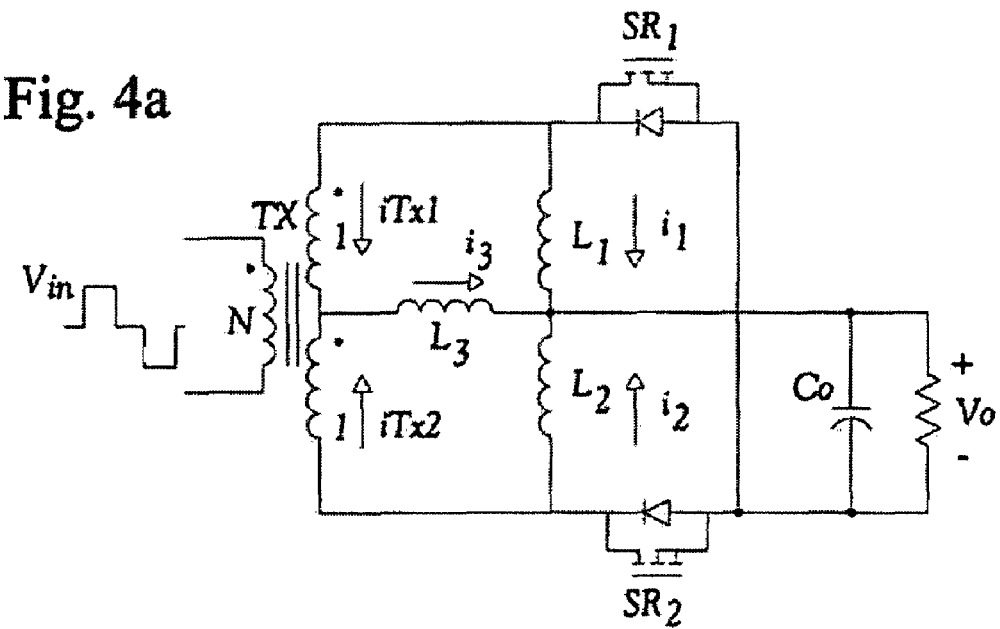
FIG. 4a is a schematic diagram of a current tripler rectifier of the present invention.
Figure 4B:
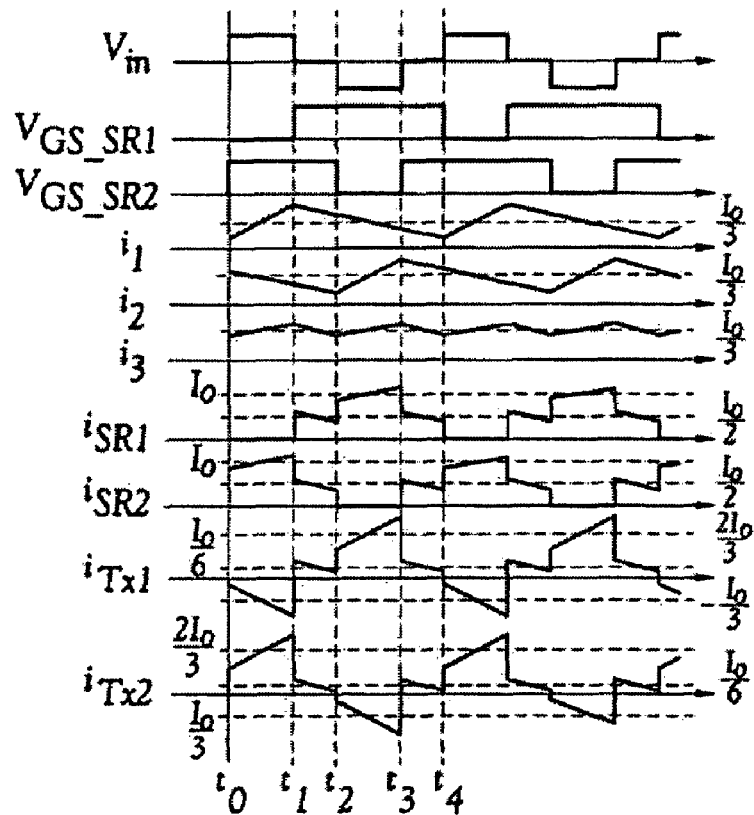

The method, system, apparatus and device of the present invention provides a current tripler rectification (CTR) topology and the key steady-state operation waveforms are shown in FIGS. 4a and 4b, respectively. There are three output filter inductors $L_1$, $L_2$ and $L_3$ and the transformer Tx secondary side is center-tapped. The primary ac voltage pulse can be generated by state-of-the-art topologies such as push-pull, half bridge and full bridge primary-side topologies. The transformer turns ratio is n: 1:1 as labeled.

Ignoring the leakage inductance and applying ac voltage pulse to the primary side of the transformer Tx as shown in FIG. 4, according to volt-second balance across the inductors, the output voltage is obtained in terms of duty cycle and input voltage.

$$V_o = \frac{2 \cdot D \cdot V_{in}}{n} \quad (0 \le D \le 0.5) \tag{1}$$

where $V_{in}$ is the input voltage, and D is the steady-state duty cycle value. The dc voltage gain of the above current tripler rectifier is the same for both the center-tapped and the current doubler rectification topologies. By removing either the inductor $L_3$, or by removing both the inductors $L_1$ and $L_2$ from the topology of the present invention, these respective conventional topologies are obtained.

Neglecting the inductor current ripple, each inductor's dc current is one third of the load current:

$$I_1 = I_2 = I_3 = \frac{1}{3} I_o, \quad (2)$$

where $I_o$ is the load current. When the applied ac pulse is absolutely symmetrical, the dc bias of the transformer's magnetizing current is zero:

$$I_M = 0 \quad (3)$$

The operation principle of the current tripler rectifier is described by four operation modes as shown in FIGS. 5a-5d, when a symmetrical ac pulse signal is applied to the primary side of the transformer. For this description of circuit operation, the following assumptions are made:
The converter operates in steady state.
Components are considered ideal except otherwise indicated.
Leakage inductance $L_l$ is neglected.

Figure 5A:
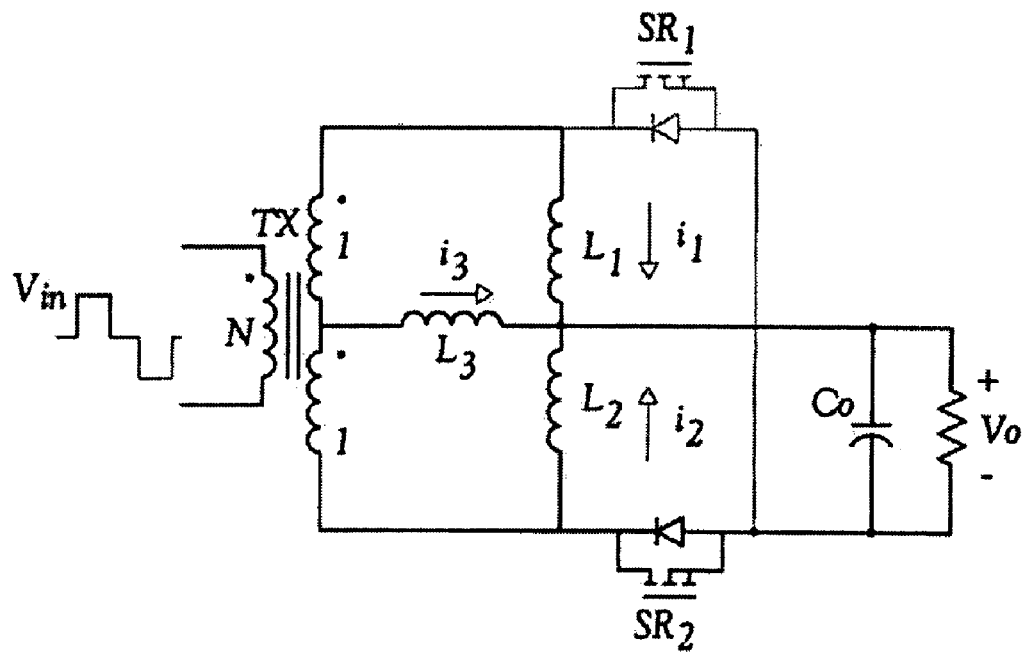
FIG. 5a is schematic diagrams showing operation of the current tripler rectifier during a first mode of operation, respectively, according to the present invention.

In FIGS. 5a-d, the active portion of the circuit is shown with bold lines while the inactive circuitry is shown with thin black lines. As shown in FIG. 5a in conjunction with the waveforms shown in FIG. 4b, in Mode 1 ($t_0 < t < t_1$); At $t_0$, the positive voltage $V_{in}$ is applied to the primary side of transformer Tx. Switch $SR_1$ is turned off and $SR_2$ is on. The inductor $L_1$ is linearly charged by voltage $$\left( \frac{2 \cdot V_{in}}{n} - V_o \right),$$

and in the inductor $L_1$ current $L_3$ linearly increases as shown in FIG. 4b at the slope:

$$\frac{di_1}{dt} = \frac{\frac{2 \cdot V_{in}}{n} - V_o}{L_1} \quad (4)$$

where $V_o$ is the output voltage and n is the transformer's turns ratio. The inductor $L_3$ is linearly charged by voltage difference between the reflected input voltage in the secondary side and the output voltage, and inductor current $i_3$ is increasing with the slope:

$$\frac{di_3}{dt} = \frac{\frac{V_{in}}{n} - V_o}{L_3} \quad (5)$$

During the Mode 1 interval shown in FIG. 5a, inductor $L_2$ is discharged by the output voltage $V_o$. The inductor current $i_2$ freewheels through output capacitor $C_O$ and $SR_2$, and decreases linearly shown in FIG. 4b at the following slope:

$$\frac{di_2}{dt} = \frac{V_o}{L_2} \quad (6)$$

Figure 5B:
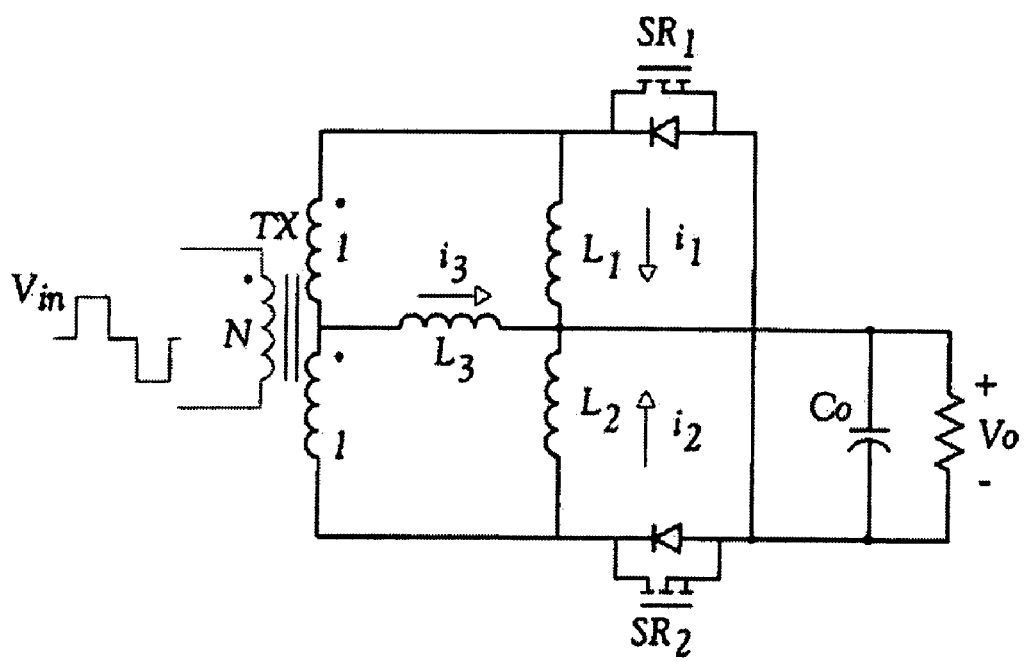
FIG. 5b is schematic diagrams showing operation of the current tripler rectifier during a second mode of operation, respectively, according to the present invention.

Referring to FIG. 5b in conjunction with FIG. 4b, in Mode 2 ($t_1 < t < t_2$) the transformer Tx primary is shorted or opened according to the operation and control of the primary-side topology at $t_1$. Switches $SR_1$ and $SR_2$ are both on, as shown by the thick black lines in FIG. 5b, to provide a freewheeling path for the three filter inductor currents $i_1$, $i_2$ and i3. As shown by the three inductor current waveforms in FIG. 4b, the three output inductors $L_1$, $L_2$ and $L_3$ are all linearly discharged by the output voltage $V_o$, and the three inductor currents decrease at the same slope as follows:

$$\frac{di_1}{dt} = \frac{V_o}{L_1} \quad (7)$$

$$\frac{di_2}{dt} = \frac{V_o}{L_2} \quad (8)$$

$$\frac{di_3}{dt} = \frac{V_o}{L_3} \quad (9)$$

showing that each of the three inductor currents during Mode 2 are approximately one-third of the output current $I_o/3$.

Figure 5C:
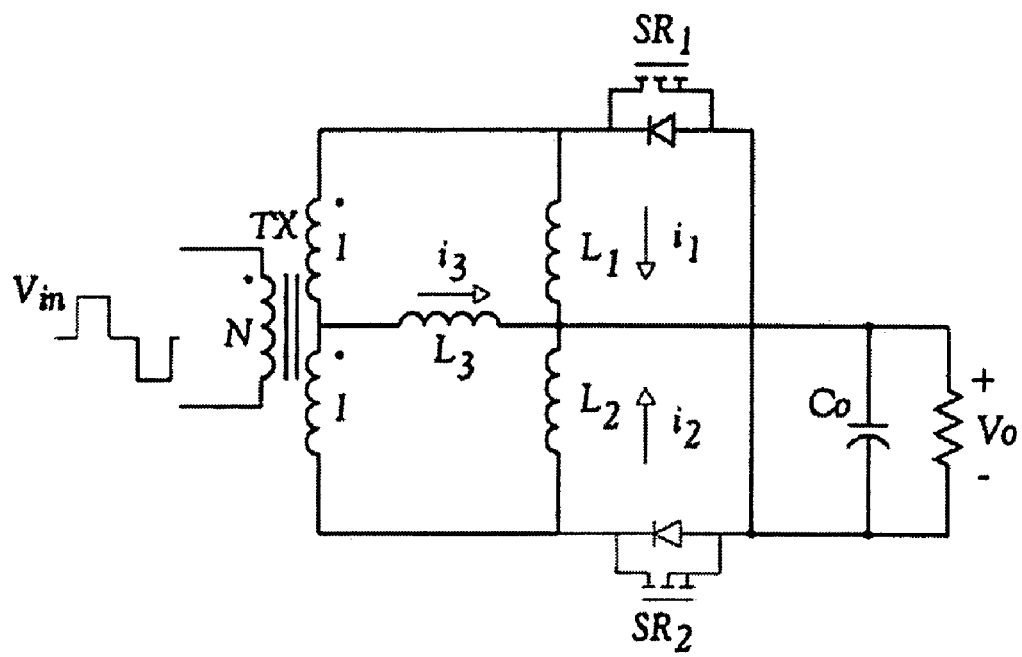
FIG. 5c is schematic diagrams showing operation of the current tripler rectifier during a third mode of operation, respectively, according to the present invention.

FIG. 5c shows an operational circuit during Mode 3 ($t_2 < t < t_3$). As shown in FIG. 4b, at $t_2$ the negative voltage $-V_{in}$ is applied to the primary-side of the transformer. Switch $SR_1$ is on and $SR_2$ is turned off. The inductor $L_1$ is linearly discharged by the output voltage $V_o$, and the inductor $L_1$ current $i_1$ freewheels as shown in FIG. 4b and decreases at the following slope:

$$\frac{di_1}{dt} = \frac{V_o}{L_1} \quad (10)$$

The inductor $L_2$ is charged by the difference voltage $$\left( \frac{2 \cdot V_{in}}{n} - V_o \right),$$

and the inductor current $i_3$ linearly increases at the slope:

$$\frac{di_2}{dt} = \frac{\frac{2 \cdot V_{in}}{n} - V_o}{L_2} \quad (11)$$

The inductor $L_3$ is linearly charged by difference voltage $$\left( \frac{V_{in}}{n} - V_o \right),$$

and $i_3$ increases with the slope:

$$\frac{di_3}{dt} = \frac{\frac{V_{in}}{n} - V_o}{L_3} \quad (12)$$

Figure 5D:
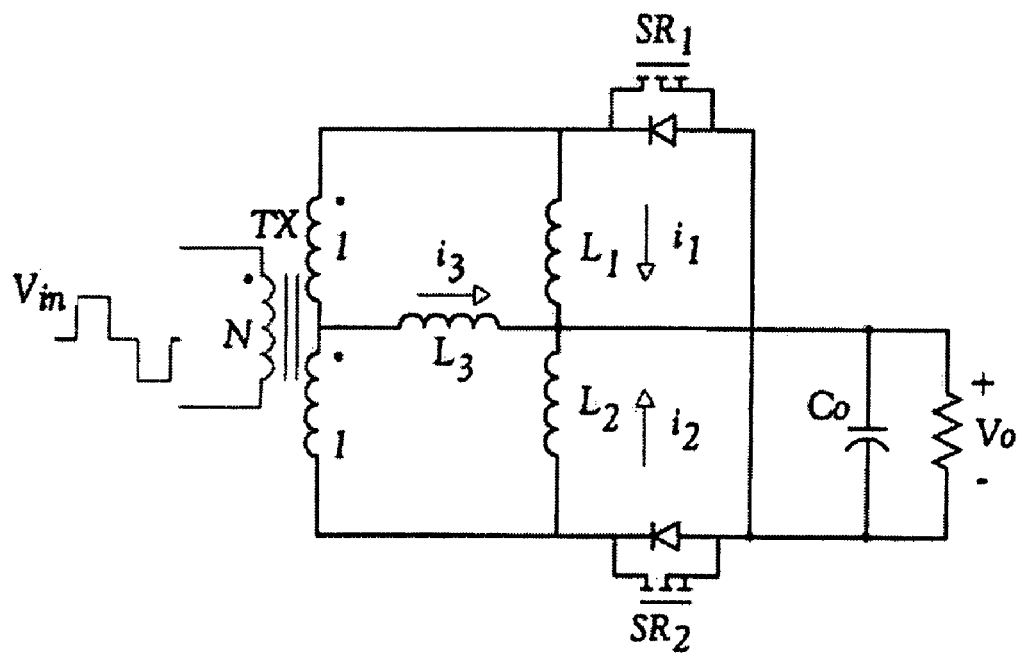
FIG. 5d is schematic diagrams showing operation of the current tripler rectifier during a fourth mode of operation, respectively, according to the present invention.

The operational circuit for Mode 4 is shown in FIG. 5d for the time period ($t_3 < t < t_4$). At $t_3$, the transformer primary side voltage becomes zero, and it repeats the same freewheeling mode as shown in FIG. 4b and described for Mode 2 operation until the time instant $t_4$. As shown, the three inductor currents decrease with the same slope as:

$$\frac{di_1}{dt} = \frac{V_o}{L_1} \quad (13)$$

$$\frac{di_2}{dt} = \frac{V_o}{L_2} \quad (14)$$

$$\frac{di_3}{dt} = \frac{V_o}{L_3} \quad (15)$$

The operation mode returns to Mode 1 after Mode 4, and a next switch cycle starts.

The current tripler rectification topology of the present invention can be used with double-ended primary-side topologies such as push-pull, half bridge and full bridge. There is no difference between the current tripler rectifier and the conventional center-tapped and current doubler rectifiers in terms of the control and operation of the primary-side topologies. In addition, the driving signals for the secondary-side synchronous rectifiers (SRs) are identical to those for the conventional center-tapped and current doubler rectifiers.

In the topology of the present invention described above, there are three output inductors $L_1$, $L_2$ and $L_3$ evenly sharing the load current $I_o$ and thus the current stress is relieved in high current applications. As a result, the inductors design is simplified and better thermal management is achieved.

Detailed comparison between the topology of the present invention and the conventional center-tapped and current-doubler rectifiers are shown in the table of FIG. 11. For fair comparison, assume that three rectifiers operate with the same switching frequency and have the identical input and output voltages, as well as equal load currents and output ripple currents. Current values in Table 1 do not reflect the effect of the ac components in the inductor currents for the purpose of simplicity.

FIG. 11 shows that the current tripler rectifier has the same dc voltage gain as the center-tapped and current doubler rectifiers, and as a result, the steady-state duty cycle values are also the same. In addition, the rms current and voltage stress of synchronous rectifiers are the same. As mentioned above, the driving signals for the synchronous rectifiers are also the same. Therefore, the design of the primary-side circuits, transformer and synchronous rectifiers are the same for the three compared rectification topologies.

The inductor currents in the current tripler rectifier are only one-third of that in the center-tapped rectifier, while the individual inductor currents in the current doubler rectifier are half of that in the center-tapped rectifier. However, to achieve the same output ripple current, the filter inductance in the current doubler rectifier need to be doubled, and the filter inductance in the current tripler rectifier need to be tripled as shown in FIG. 11. One of the distinct features for the current tripler rectifier is its better current distribution and possible lower power dissipation across the power train, which alleviates difficulties in thermal management and packaging for high current applications, which leads to potentially increased power density.

Since the load current is evenly shared by three independent output inductors as shown in FIG. 11, the topology has the lowest total inductor copper loss as compared with the center-tapped and the current doubler rectifier given identical dc resistance for each inductor. Another advantage of the rectification technique of the present invention is the simplest magnetic design for inductors because of the reduction in the inductor dc current.

Besides, the current tripler rectifier has better transformer utilization and lower transformer winding conduction loss than the center-tapped rectification in that the secondary winding in the rectifier is used all over the switch cycle and only carries partial load current when conducting. As shown in FIG. 11, transformer secondary winding rms current in the current tripler rectifier is also lower than that in the center-tapped rectifier.

Also, the addition of the third inductor is a benefit to PCB layout design and power density improvement. Since the physical size of the magnetic core is proportional to the energy stored in it $$\left(\frac{1}{2}I^2L\right),$$

the total volume of three inductors should be the same as that of the current doubler rectifier and the center-tapped rectifier. For discrete magnetics approach, the individual inductor size is reduced, which makes PCB layout design more flexible. Further converter size reduction can benefit from integrated magnetics and correspondingly increase the power density.

Therefore, compared to the center-tapped rectifier and the current doubler rectifier, the current tripler topology of the present invention has high current capability, well-distributed power dissipation and good thermal management for high current applications.

Figure 6:
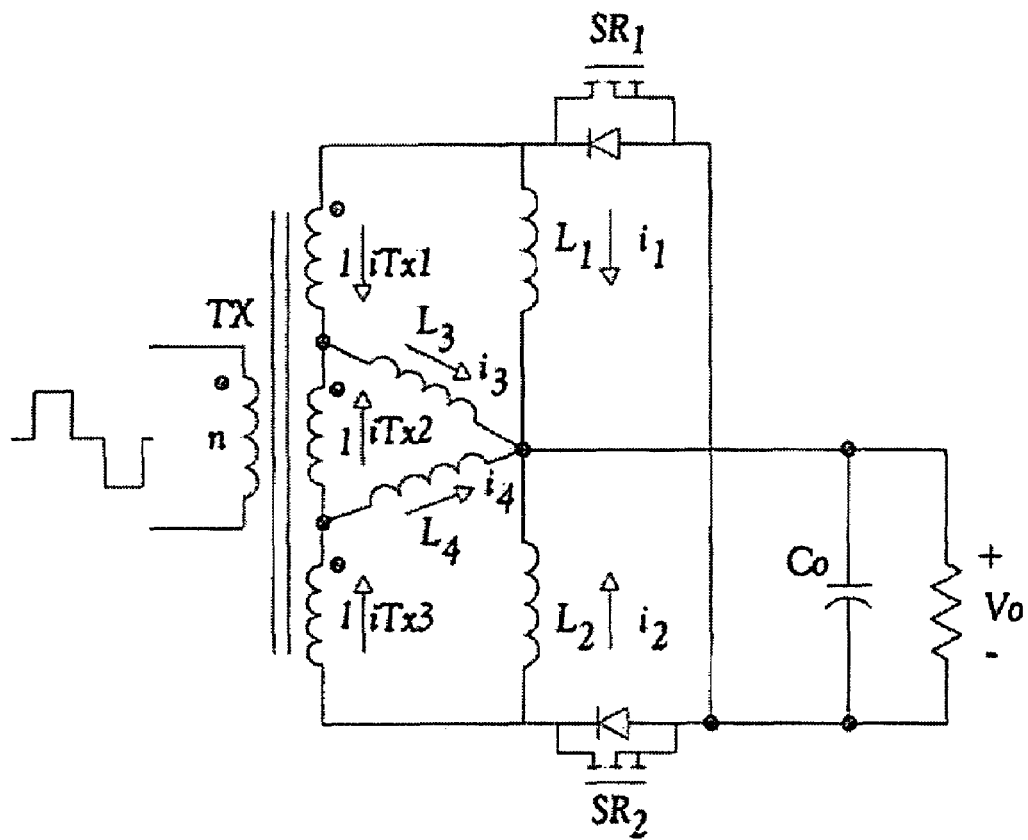
FIG. 6 is a schematic diagram of a current quadrupler rectifier topology according to the present invention.
Figure 7:
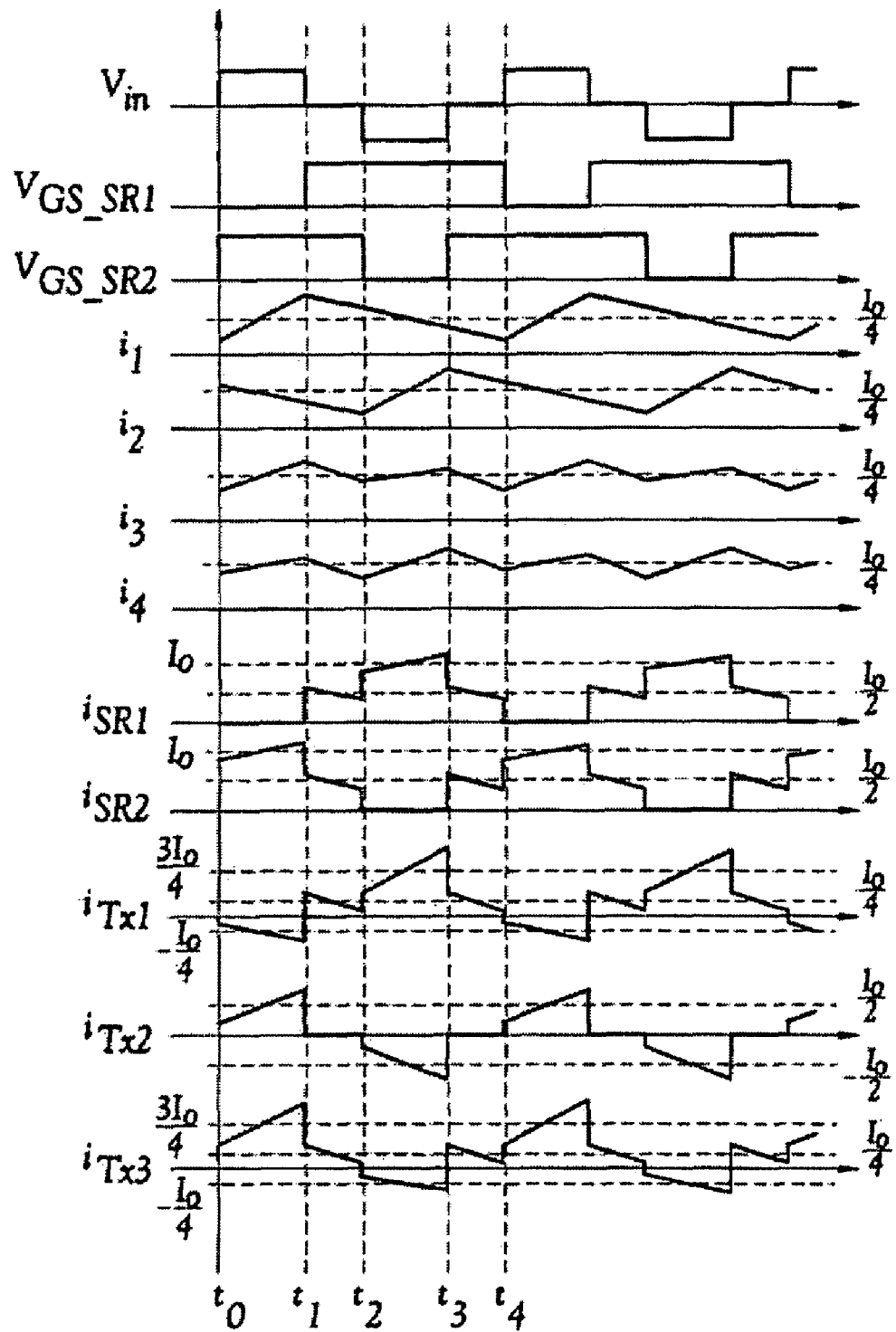
FIG. 7 shows waveforms corresponding to steady state operation of the current quadrupler rectifier shown in FIG. 6.

The current tripler rectification concept of the present invention can be extended to the Current Quadrupler rectifier topology as shown in FIG. 6. FIG. 7 shows the current quadrupler rectifier's key waveforms for steady-state operation for Mode 1, Mode 2, Mode 3 and Mode 4. Like the current tripler rectifier previously described, the four individual inductors $L_1$, $L_2$, $L_3$ and $L_4$ evenly share the load current $I_o$ and the transformer secondary side winding carries partial load current in the current quadrupler rectifier. As a result, the current quadrupler has even higher current capability and better thermal management than the current tripler topology. Since each inductor current is only one fourth of load current, the inductor magnetic design is further simplified than that in the current tripler rectifier. However, the transformer design is more complex since there are three secondary windings. As a result, there's a trade-off in selection of rectifier topologies.

Figure 8:
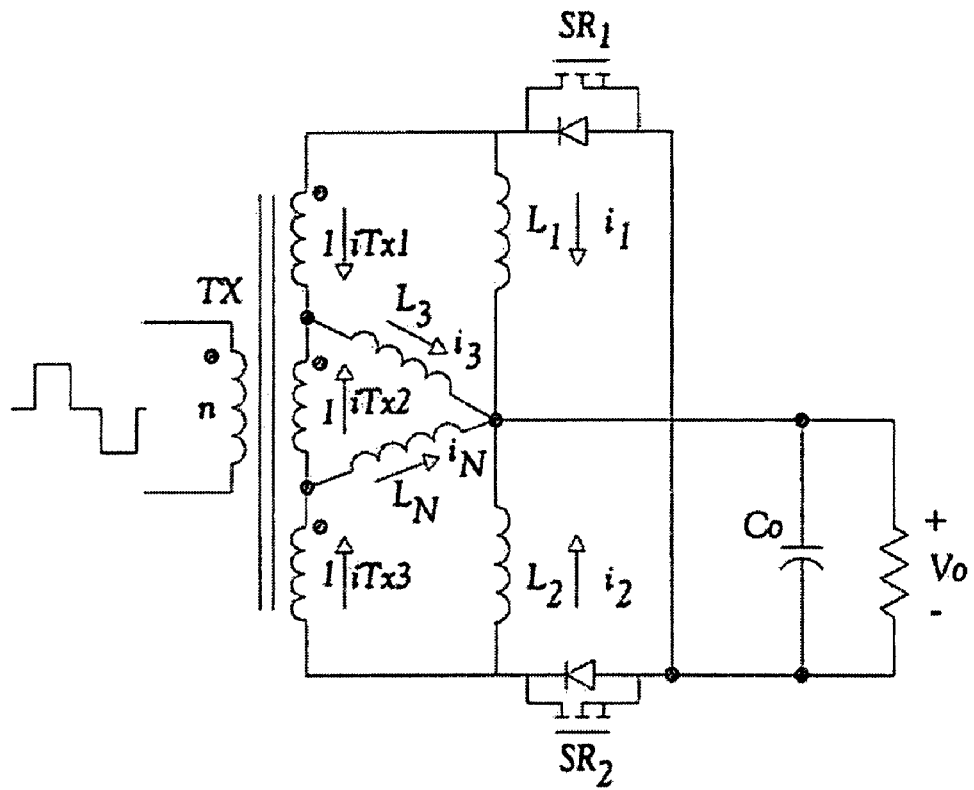
FIG. 8 is a schematic diagram of a current N-tupler rectifier topology according to the present invention.

In general, the current tripler rectification concept can be extended to the current N-tupler rectifier as shown in FIG. 8. In this example, there are (N-1) transformer secondary-side windings and N inductors in the current N-tupler rectification topology. Each inductor evenly shares $$\frac{1}{N}$$

load current, leading to more evenly distributed power dissipation over the power train and thus easier power management. As a matter of fact, current doubler and current tripler rectifiers are particular examples of the current N-tupler topologies where N is two and three, respectively.

Similar to the current tripler rectifier, the inductor magnetic design is simplified due to the reduction of the dc bias current and it has the same control and operation of primary side topology as conventional current doubler rectifier without any complexity increase in driving circuitry for switches SRs. However, the current N-tupler rectifier becomes impractical for higher current output when N is larger than four because there are too many filter inductors and secondary-side windings for the transformer resulting in complicated transformer structure as shown in FIG. 8.

An experimental prototype of the symmetrical half bridge dc-dc converter with the current tripler rectifier was built with the nominal input voltage 48V, output voltage 1.2V, and maximum load current of 45 A. In the prototype, Si7456 is used for two main switches $S_1$ and $S_2$ of the primary-side half bridge converter, and Si7868 MOSFET manufactured by Vishay is used for the secondary-side synchronous rectifier $SR_1$ and $SR_2$, two in parallel each side. Core ER14.5/3F3 Manufactured by Bobbin is selected as the planar transformer with turns ratio of 12:1:1. The converter runs at the switching frequency of 211 kHz and each output inductor has an inductance value of 0.8 μH and DCR value of 0.588 mΩ.

Figure 9:
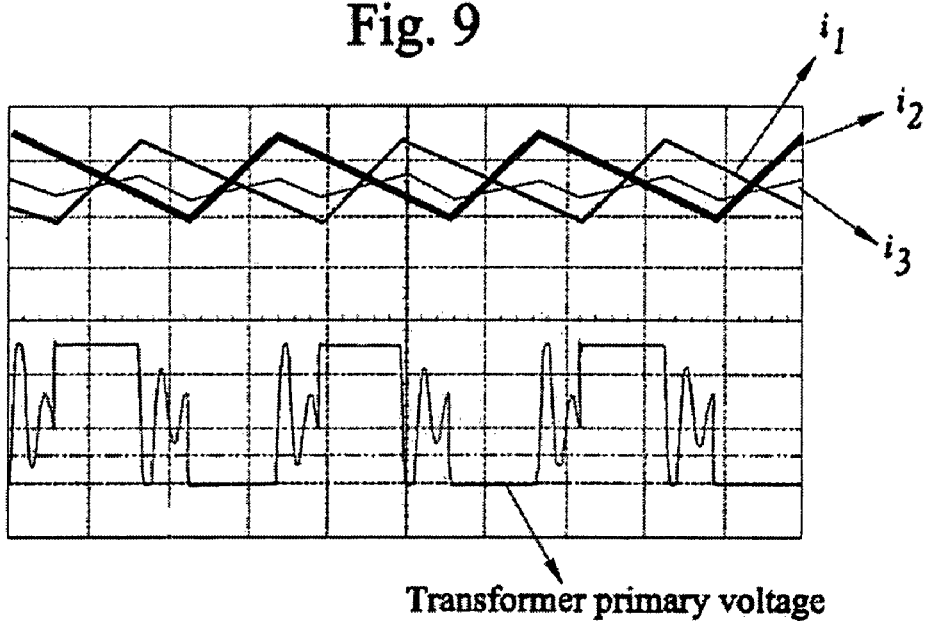
FIG. 9 shows waveforms produced from an experimental prototype according to the present invention.
Figure 10:
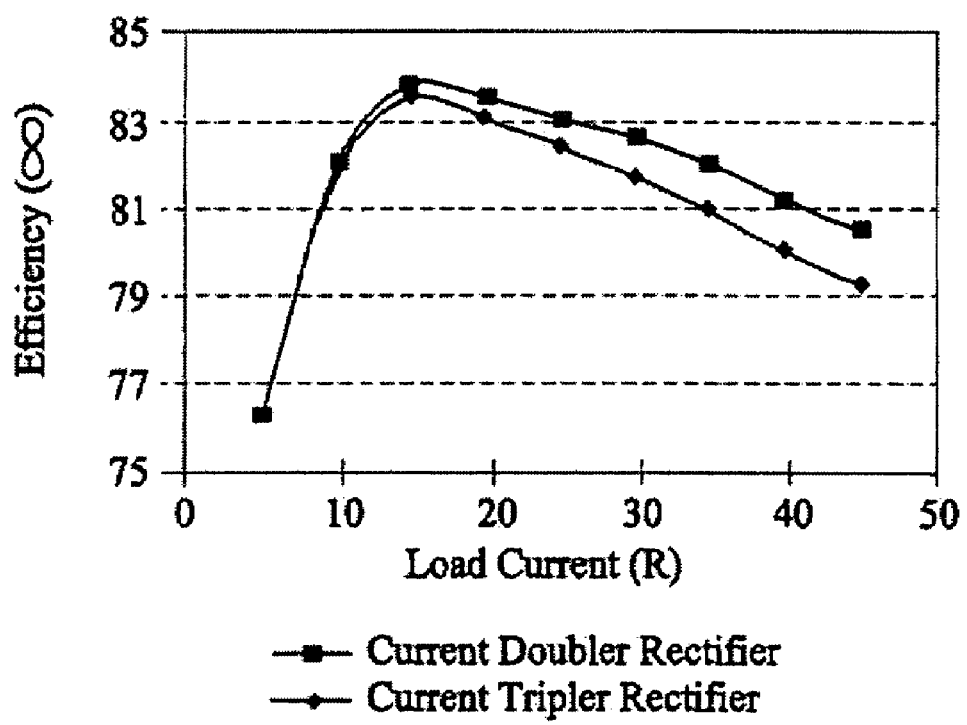
FIG. 10 is a graph showing the efficiency comparison for an input voltage of 48V.

The experimental current waveforms $i_1$, $i_2$ and $i_3$ of the topology of the present invention are shown in FIG. 9 as well as the transformer primary voltage waveform $V_{in}$. As shown, the load current is evenly distributed in the three inductors. Removing the inductor $L_3$ from the topology of the present invention, the converter becomes the conventional half bridge dc-dc converter with the current doubler synchronous rectifier. FIG. 10 compares the efficiency curves between the CTR rectifier and the conventional current doubler rectifier at $V_{in}$=48V, which are measured with the same primary-side half bridge dc-dc converter respectively. As shown, the current triper rectifier achieves up to 1.5% efficiency improvement over the current doubler rectifier at 45 A load, which verifies that the topology is advantageous over the conventional current doubler rectifier. Noting that the efficiency improvement increases with the load current in FIG. 10 verifies that the current tripler rectifier is more suitable for high current applications than the current doubler rectifier and significant efficiency improvement is expected for higher output current.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A DC-to-DC converter comprising:
    a transformer having a primary side winding and a secondary side winding having a secondary tap;
    an input voltage source for applying ac voltage to the primary side winding of the transformer;
    a first and second output filter inductor serially connected in parallel with the secondary side winding;
    a center output filter inductor having a first end and a second end, the first end connected to the secondary tap and second end connected to a serial connection of the first and second output inductor;
    a serially connected first and a second switching device connected in parallel with the first and second output inductors for receiving a driving signal to control the operation of the first and second switching devices during steady state operation; and
    a output load connected between the serial connection of the first and second output inductor and the serial connection of the first and second switching devices, wherein the output filter inductors evenly share an output current resulting in a reduction in operational stress during high current application.

2. The DC-to-DC converter of claim 1, wherein the input voltage source comprises:
    a double-ended primary-side topology.

3. The DC-to-DC converter of claim 2, wherein the double-ended primary-side topology comprises:
    a half bridge primary topology.

4. The DC-to-DC converter of claim 2, wherein the double-ended primary-side topology comprises:
    a full bridge primary topology.

5. The DC-to-DC converter of claim 2, wherein the double-ended primary-side topology comprises:
    a push-pull primary topology.

6. The DC-to-DC converter of claim 1, wherein the transformer secondary side winding comprises:
    a center-tapped secondary side winding, wherein the transformer turns ration is n: 1:1.

7. The DC-DC converter of claim 6, wherein the center output filter inductor comprises:
    a third output filter inductor forming a current tripler rectification topology, wherein the current tripler rectifier control and operation of the primary side topologies is the same as used for conventional center-tapped and current doubler rectifiers.

8. The DC-DC converter of claim 1, wherein the input voltage pulse comprises:
    a symmetrical ac pulse signal for controlling an operation of the first and second switching devices for four modes of operation during each switching cycle.

9. The DC-to-DC converter of claim 8, wherein the four modes of operation comprise:
    a first mode when the symmetrical ac pulse signal applied to the transformer primary side winding is positive, wherein the first switching device is turned off and the second switching device is turned on;
    a second mode when the symmetrical ac pulse signal applied to the transformer primary side winding is a zero voltage, wherein the first and second switching devices are turned on;
    a third mode when the symmetrical ac pulse signal applied to the transformer primary side winding is a negative input voltage, wherein the first switching device is turned on and the second switching device is turned off; and
    a fourth mode when the symmetrical ac pulse signal applied to the transformer primary side winding is zero voltage, wherein the first and second switching devices are turned on.

10. The DC-to-DC converter of claim 1, wherein the transformed secondary side winding comprises:
    a first and a second tap, the first tap between a first and second secondary winding and the second tap between the second secondary winding and a third secondary winding.

11. The DC-to-DC converter of claim 10, wherein the center output filter inductor comprises:
    a fourth output filter inductor connected between the first tap and the serial connection of the first and second output filter inductors; and
    a fifth output filter inductor connected between the second tap and the serial connection of the first and second output filter inductors forming a current quadrupler rectifier, wherein the first, second, fourth and fifth output filter inductors evenly share a load current and the transformer secondary side winding carries partial load current to have higher current capability for DC-DC conversion.

12. The DC-to-DC converter of claim 11, wherein the input voltage source comprises:
   a half bridge primary topology.

13. The DC-to-DC converter of claim 11, wherein the input voltage source comprises:
   a full bridge primary topology.

14. The DC-to-DC converter of claim 11, wherein the input voltage source comprises:
   a push-pull primary topology.

15. The DC-to-DC converter of claim 1, wherein the transformer tapped secondary comprises:
   N-1 secondary-side windings having N-2 secondary taps between adjacent secondary side windings.

16. The DC-to-DC converter of claim 15, wherein the center output filter inductor comprises:
   N output filter inductors, one end of each output filter inductors connected to one of the (N-2) secondary side taps, the other end of the N output filter inductors connected to the serial connection of the first and second output filter inductors to form a N-tupler rectifier, wherein each of the N output filter inductors evenly shares 1/N load current.

17. The DC-DC converter of claim 16, wherein the input voltage pulse comprises:
   a symmetrical ac pulse signal for controlling an operation of the first and second switching devices for four modes of operation during each switching cycle.

18. The DC-to-DC converter of claim 16, wherein the input voltage source comprises:
   a half bridge primary topology.

19. The DC-to-DC converter of claim 16, wherein the input voltage source comprises:
   a full bridge primary topology.

20. The DC-to-DC converter of claim 16, wherein the input voltage source comprises:
   a push-pull primary topology.

* * * * *